United States Patent
Saruwatari et al.

(10) Patent No.: US 9,979,020 B2
(45) Date of Patent: May 22, 2018

(54) NONAQUEOUS ELECTROLYTE BATTERY AND BATTERY PACK

(71) Applicant: KABUSHIKI KAISHA TOSHIBA, Minato-ku (JP)

(72) Inventors: Hidesato Saruwatari, Kawasaki (JP); Hikaru Yoshikawa, Kashiwazaki (JP); Hiromichi Kuriyama, Yokkaichi (JP); Yasuaki Murashi, Kashiwazaki (JP); Naoki Nishio, Kashiwazaki (JP); Dai Yamamoto, Kashiwazaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 126 days.

(21) Appl. No.: 15/053,437

(22) Filed: Feb. 25, 2016

(65) Prior Publication Data

US 2016/0268604 A1 Sep. 15, 2016

Related U.S. Application Data

(63) Continuation of application No. PCT/JP2015/057329, filed on Mar. 12, 2015.

(51) Int. Cl.
*H01M 4/50* (2010.01)
*H01M 4/48* (2010.01)
(Continued)

(52) U.S. Cl.
CPC ........ *H01M 4/505* (2013.01); *C01G 45/1242* (2013.01); *C01G 51/42* (2013.01);
(Continued)

(58) Field of Classification Search
CPC ................. H01M 4/50; H01M 4/525
See application file for complete search history.

(56) References Cited

U.S. PATENT DOCUMENTS

2006/0046155 A1* 3/2006 Inagaki .............. H01M 4/131
429/332
2006/0063070 A1* 3/2006 Chiga .................. C01G 51/42
429/231.1
(Continued)

FOREIGN PATENT DOCUMENTS

JP 2001-48545 2/2001
JP 2001-192208 7/2001
(Continued)

OTHER PUBLICATIONS

International Search Report dated Apr. 28, 2015 in PCT/JP2015/057329 (submitting English translation only).
(Continued)

*Primary Examiner* — Matthew J Merkling
(74) *Attorney, Agent, or Firm* — Oblon, McClelland, Maier & Neustadt, L.L.P.

(57) ABSTRACT

According to one embodiment, a nonaqueous electrolyte battery including a positive electrode, a negative electrode, and a nonaqueous electrolyte is provided. The positive electrode includes an active material including $Li_{1-x}Mn_{2-y-z}Al_yM_zO_4$ ($-0.1 \leq x \leq 1$, $0.20 \leq y \leq 0.35$, $0 \leq z \leq 0.1$, M is at least one metal selected from Mg, Ca, Ti, V, Cr, Fe, Co, Ni, Cu, Zn, Zr, Nb, Mo, and Sn). The negative electrode includes an active material including a first oxide represented by $Li_{4+a}Ti_5O_{12}$ ($-0.5 \leq a \leq 3$) and a second oxide of at least one element selected from Al, Co, Cr, Cu, Fe, Mg, Ni, Zn, and Zr. The second oxide is included in an amount of from 300 ppm to 5000 ppm relative to a weight of the first oxide.

5 Claims, 3 Drawing Sheets

(51) Int. Cl.
*H01M 4/505* (2010.01)
*H01M 4/485* (2010.01)
*C01G 45/12* (2006.01)
*C01G 51/00* (2006.01)
*C01G 53/00* (2006.01)
*H01M 10/0525* (2010.01)
*H01M 4/02* (2006.01)

(52) U.S. Cl.
CPC ............ *C01G 53/50* (2013.01); *H01M 4/485* (2013.01); *C01P 2002/54* (2013.01); *C01P 2004/61* (2013.01); *C01P 2004/82* (2013.01); *C01P 2006/40* (2013.01); *H01M 10/0525* (2013.01); *H01M 2004/027* (2013.01); *H01M 2004/028* (2013.01)

(56) References Cited

U.S. PATENT DOCUMENTS

| | | | |
|---|---|---|---|
| 2006/0216600 A1* | 9/2006 | Inagaki | H01M 2/06 429/231.1 |
| 2008/0213665 A1* | 9/2008 | Nishida | H01M 4/485 429/223 |
| 2010/0255352 A1 | 10/2010 | Inagaki et al. | |
| 2011/0171529 A1* | 7/2011 | Kono | H01M 4/0471 429/223 |
| 2014/0038062 A1 | 2/2014 | Kawakami et al. | |

FOREIGN PATENT DOCUMENTS

| | | |
|---|---|---|
| JP | 2007-294164 | 11/2007 |
| JP | 2008-59980 | 3/2008 |
| JP | 2009-245929 | 10/2009 |
| JP | 2012-230897 | 11/2012 |
| JP | 2014-63668 | 4/2014 |
| WO | WO 2011/145443 A1 | 11/2011 |
| WO | WO 2012/029697 A1 | 3/2012 |

OTHER PUBLICATIONS

International Search Report dated Apr. 28, 2015 in PCT/JP2015/057329 filed Mar. 12, 2015 (with English Translation of Categories of Cited Documents).

Written Opinion dated Apr. 28, 2015 in PCT/JP2015/057329 filed Mar. 12, 2015.

* cited by examiner

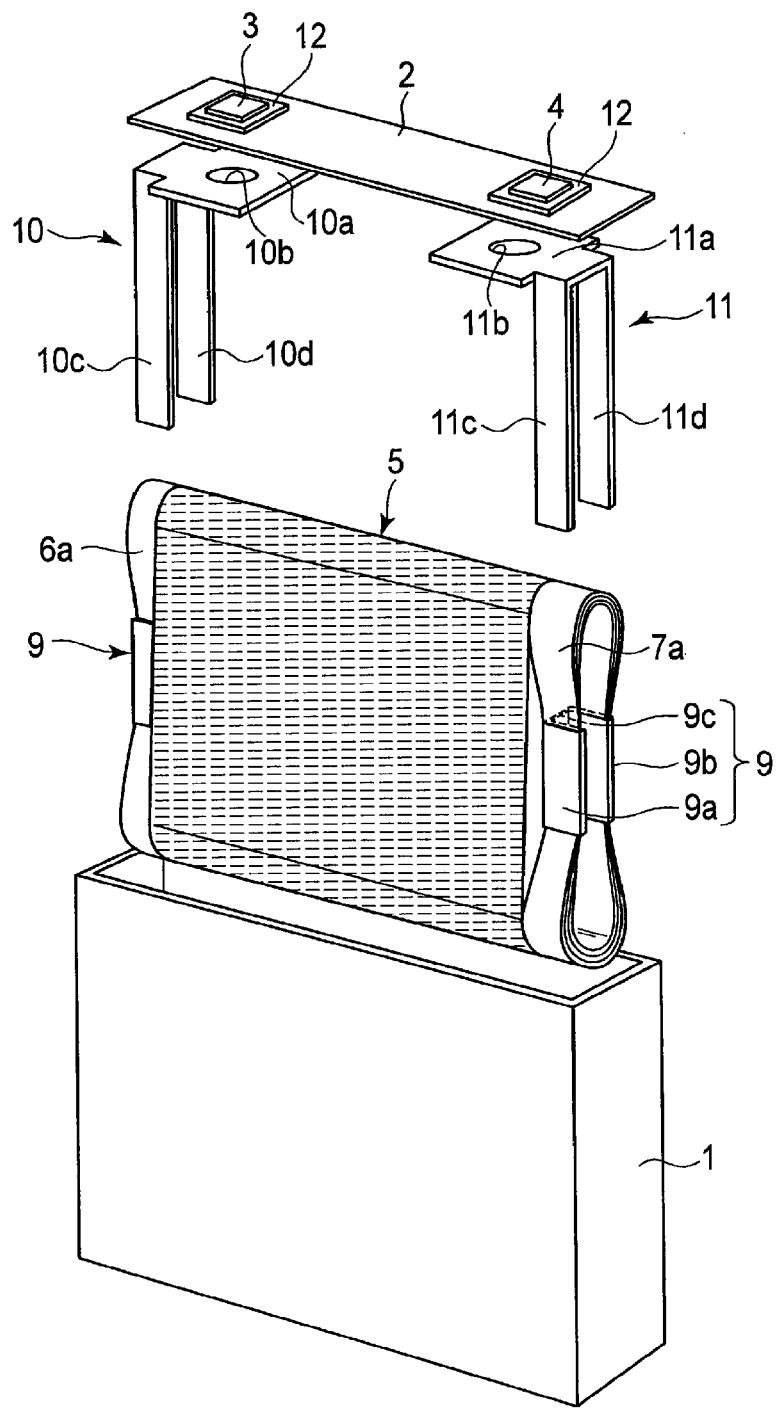
F I G. 1

NONAQUEOUS ELECTROLYTE BATTERY AND BATTERY PACK

CROSS-REFERENCE TO RELATED APPLICATION

This application is based upon and claims the benefit of priority from prior International Application No. PCT/JP2015/057329, filed Mar. 12, 2015, the entire contents of which are incorporated herein by reference.

FIELD

Embodiments relate to a nonaqueous electrolyte battery and a battery pack.

BACKGROUND

Spinel-type lithium manganese composite oxides and lithium cobalt composite oxides are known as positive electrode active materials of lithium ion secondary batteries. Spinel-type lithium manganese composite oxides have a problem that compared to lithium cobalt composite oxides, their capacities are more degraded when repeatedly charged and discharged under a high temperature environment. In order to solve this problem, improvement of the crystal structure of the lithium manganese composite oxides is effective. The crystal structure can be improved by substituting a portion of Mn of the lithium manganese composite oxide with a foreign metal. It is known that Al is suitable as the foreign metal.

On the other hand, spinel-type lithium titanium composite oxides are known as negative electrode active materials of lithium ion secondary batteries. Spinel-type lithium titanium composite oxides are negative electrode active materials having high structure stability and high reliability, but are known to have a problem that they emit gas during operation of the battery.

BRIEF DESCRIPTION OF THE DRAWINGS

FIG. 1 is an exploded perspective view of a nonaqueous electrolyte battery according to an embodiment.

DETAILED DESCRIPTION

Figure 2:
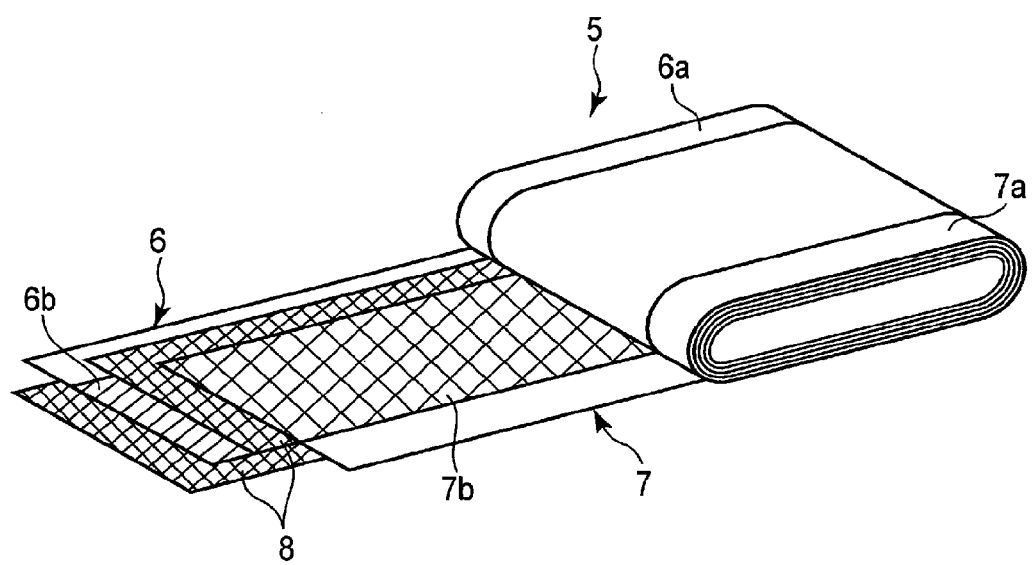
FIG. 2 is a partially spread out perspective view of an electrode group used in the nonaqueous electrolyte battery of FIG. 1.

According one another embodiment, a nonaqueous electrolyte battery including a positive electrode, a negative electrode, and a nonaqueous electrolyte is provided. The positive electrode includes an active material including $Li_{1-x}Mn_{2-y-z}Al_yM_zO_4$ (wherein $-0.1 \leq x \leq 1$, $0.20 \leq y \leq 0.35$, $0 \leq z \leq 0.1$, M is at least one metal selected from the group consisting of Mg, Ca, Ti, V, Cr, Fe, Co, Ni, Cu, Zn, Zr, Nb, Mo, and Sn). The negative electrode includes an active material including a first oxide represented by $Li_{4+a}Ti_5O_{12}$ ($-0.5 \leq a \leq 3$) and a second oxide of at least one element selected from the group consisting of Al, Co, Cr, Cu, Fe, Mg, Ni, Zn, and Zr. In the active material of the negative electrode, the second oxide is included in an amount of from 300 ppm to 5000 ppm relative to the weight of the first oxide.

According to another embodiment, a battery pack including the nonaqueous electrolyte battery is provided.

Embodiments are described below with reference to drawings.

First Embodiment

As a result of dedicated research, inventors of the present application have found that in a nonaqueous electrolyte battery including a positive electrode including an active material including $Li_{1-x}Mn_{2-y-z}Al_yM_zO_4$ ($-0.1 \leq x \leq 1$, $0.20 \leq y \leq 0.35$, $0 \leq z \leq 0.1$, M is at least one metal selected from the group consisting of Mg, Ca, Ti, V, Cr, Fe, Co, Ni, Cu, Zn, Zr, Nb, Mo, and Sn), and a negative electrode including an active material including a first oxide represented by $Li_{4+a}Ti_5O_{12}$ ($-0.5 \leq a \leq 3$) and a second oxide of at least one element selected from the group consisting of Al, Co, Cr, Cu, Fe, Mg, Ni, Zn, and Zr in an amount of from 300 ppm to 5000 ppm relative to the first oxide, capacity degradation and resistance increase during charging and discharging cycles are suppressed to thereby exhibit excellent cycle characteristics, and at the same time, an amount of gas generation is low.

The lithium manganese composite oxide, as the positive electrode active material, represented by $Li_{1-x}Mn_{2-y-z}Al_yM_zO_4$ shows more excellent cycling characteristics when the doping amount y of the foreign metal Al is set to a range of $0 \leq y < 0.20$. The inventors have found that this is due to the crystal structure of the lithium manganese composite oxide being improved, and thereby the amount of Mn elution from the positive electrode being decreased. In the case that y is $0 \leq y < 0.20$, when $Li_{4+a}Ti_5O_{12}$ is used as the negative electrode active material ($-0.5 \leq a \leq 3$), the amount of gas generation is low for the nonaqueous electrolyte battery.

On the other hand, if y is set to $0.20 \leq y \leq 0.35$, in order to further improve the crystal structure in the lithium manganese composite oxide represented by $Li_{1-x}Mn_{2-y-z}Al_yM_zO_4$, when $Li_{4+a}Ti_5O_{12}$ ($-0.5 \leq a \leq 3$) is used as a negative electrode active material, the amount of gas generated from the nonaqueous electrolyte battery under a high temperature environment increases. From this, it is supposed that Mn eluted from the positive electrode acts on the negative electrode, and exerts some kind of influence on the generation of gas from the negative electrode.

By adding to the negative electrode, an appropriate amount of an oxide of at least one element selected from the group consisting of Al, Co, Cr, Cu, Fe, Mg, Ni, Zn, and Zr, even in the case that $Li_{1-x}Mn_{2-y-z}Al_yM_zO_4$ where y is set to $0.20 \leq y \leq 0.35$ is used as the positive electrode active material, the amount of gas generated from the nonaqueous electrolyte battery was found to be almost zero. That is, by including in the negative electrode active material, a mixture where an oxide of the elements listed above is added as a second oxide into $Li_{4+a}Ti_5O_{12}$ ($-0.5 \leq a \leq 3$) as the first oxide, gas generation can be suppressed in a nonaqueous electrolyte battery using the above mentioned positive electrode active material. Herein, an appropriate amount of second oxide is from 300 ppm to 5000 ppm relative to a weight of the first oxide.

The inventors have found that, as such, both of charging and discharging cycling characteristics and suppression of gas generation amount can be achieved in a nonaqueous electrolyte battery including a positive electrode active material including a lithium manganese composite oxide represented by $Li_{1-x}Mn_{2-y-z}Al_yM_zO_4$ ($0.20 \leq y \leq 0.35$) and a negative electrode active material including a mixture of a first oxide represented by $Li_{4+a}Ti_5O_{12}$ ($-0.5 \leq a \leq 3$) and the second oxide mentioned above. It is supposed that the second oxide added to the negative electrode demonstrated a gas generation suppressing effect of some kind.

The second oxide may be included in the negative electrode as particles. The appropriate addition amount of the second oxide is from 300 ppm to 5000 ppm relative to the weight of the first oxide. If the amount of second oxide included in the negative electrode is less than 300 ppm, the effect of suppressing gas generation from the negative electrode cannot be obtained sufficiently. If the amount of second oxide included in the negative electrode is greater than 5000 ppm, electrical resistance of the nonaqueous electrolyte battery becomes high. The addition amount of second oxide is preferably from 300 ppm to 1000 ppm.

The oxide amount in $Li_{4+a}Ti_5O_{12}$ is measured by the following method. The active material is stripped off from the negative electrode, and then a portion of 5.0 g is measured out and used as the powder sample. The powder sample is subjected to high pressure pressing (e.g., under a pressing force of 15 t for 15 seconds), thereby formed into a tablet. The sample thus obtained is mounted on an X-ray fluorescence spectrometer, and the oxide amount of the target is determined by measurement.

The oxide measured by this measurement method is, for example, the second oxide added to and mixed with the negative electrode active material.

The inventors have also found that the effect of the present invention is more readily achieved by satisfying the following formula (1):

$$800 \leq (CA/A) \leq 4000 \qquad (1)$$

wherein A is the rated capacity [Ah] of the nonaqueous electrolyte battery, and CA is the area [cm$^2$] of the positive electrode.

The rated capacity is a value related to the battery capacity described in the documents showing the performance of the nonaqueous electrolyte battery, such as the instruction manual, specification, data sheet, or catalog of the nonaqueous electrolyte battery, and may be described as a nominal capacity, specified capacity, or discharge capacity. When there is no such document or no description, the value is measured by the following method.

In a 25° C. environment, the nonaqueous electrolyte battery is charged at a constant current until the battery voltage reaches 3.1 v, and then charged at a constant voltage of 3.1 V for about 2 hours. When the open circuit voltage after charging is greater than 2.6 V, charge is considered to be completed. When the open circuit voltage is smaller than 2.6 V, recharging using a power source having a smaller output is preferred. On the other hand, if the open circuit voltage is smaller than 2.6 V even after recharging, and the difference from the open circuit voltage before recharging is smaller than 0.1 V, charging is regarded as completed. The rated capacity is the discharge capacity measured when this nonaqueous electrolyte battery, where charging is completed, is discharged at a constant current until the battery voltage reaches 1.5 V, and then discharged at a constant voltage of 1.5 v for about 2 hours.

The positive electrode area CA is the area of the power-generating element formed on the current collector (e.g., metal foil) of the positive electrode taken out from a disassembled nonaqueous electrolyte battery. When the power-generating element is formed on both surfaces of the current collector, the total of the front surface and reverse surface is the positive electrode area. The area of the power-generating element of the positive electrode may be, for example, an area of the contact surface between the positive electrode current collector and the positive electrode material layer, which will be described later. That the (CA/A) value is less than 800 means, that the electrical resistance of the positive electrode is high to begin with, and therefore excellent cycling characteristics may not be achieved because of this high battery resistance. On the other hand, if the (CA/A) value is greater than 4000, side reactions tend to occur because the positive electrode is large, which can cause the battery resistance to increase, and excellent cycling characteristics may not be achieved. The more preferred range of (CA/A) is from 2000 to 3500.

In addition, the positive electrode active material preferably further includes, in addition to a lithium manganese composite oxide, a lithium cobalt composite oxide represented by $Li_{1-x}Co_{1-b}M'_bO_2$ (wherein $0.1 \leq x \leq 1$, $0 \leq b \leq 0.3$, M' is at least one metal selected from the group consisting of Al, Mg, Ca, Ti, V, Cr, Mn, Fe, Co, Ni, Cu, Zn, Zr, Nb, Mo, and Sn).

By including the lithium cobalt composite oxide in the positive electrode, the amount of elution of Mn from the lithium manganese composite oxide is reduced, and thus cycling characteristics and gas generation suppression effect are improved. The reason is not certain for why inclusion of lithium cobalt composite oxide leads to decrease in the Mn elution amount, but is considered to be as follows. It is supposed that lithium cobalt composite oxide has a function of trapping protons in the nonaqueous electrolyte battery, and this proton trapping effect is considered to decrease acid generation in the nonaqueous electrolyte battery, and thereby decreases the Mn elution amount.

The mixing ratio between the lithium manganese composite oxide and lithium cobalt composite oxide preferably satisfies the following formula (2):

$$0 \leq (W_1/W_2) \leq 1.0 \qquad (2)$$

wherein $W_1$ is the weight of the lithium cobalt composite oxide, and $W_2$ is the weight of the lithium manganese composite oxide. If the value of $(W_1/W_2)$ is more than 1.0, the performance of the positive electrode is more influenced by lithium cobalt composite oxide than by lithium manganese composite oxide, and therefore, the effect of improving cycling characteristics or suppressing gas generation cannot be achieved as easily. A more preferable range is $0.01 \leq (W_1/W_2) \leq 0.33$.

The nonaqueous electrolyte battery according to an embodiment is described in detail.

The nonaqueous electrolyte battery according to an embodiment desirably includes a positive electrode, a negative electrode, a separator disposed between the positive and negative electrodes, and a nonaqueous electrolyte.

The positive electrode may include a positive electrode current collector, and a positive electrode material layer (positive electrode active material-including layer) supported on one surface or reverse surfaces of the positive electrode current collector.

The positive electrode material layer may include a positive electrode active material. The positive electrode material layer may further include, as necessary, a conductive agent and a binder.

The positive electrode current collector may include a portion not supporting the positive electrode material layer on its surface. The portion of the positive electrode current collector not supporting the positive electrode material layer can function as a positive electrode tab. Alternatively, the positive electrode may include a positive electrode tab that is a separate entity from the positive electrode current collector.

The negative electrode may include a negative electrode current collector, and a negative electrode material layer (negative electrode active material-including layer) supported on one surface or reverse surfaces of the negative electrode current collector.

The negative electrode material layer may include a negative electrode active material. The negative electrode material layer may further include, as necessary, a conductive agent and a binder.

The negative electrode current collector may include a portion not supporting the negative electrode material layer on its surface. This portion can function as a negative electrode tab. Alternatively, the negative electrode may include a negative electrode tab that is a separate entity from the negative electrode current collector.

The separator is disposed between the positive and negative electrodes. As a result of this, the positive and negative electrode material layers can face one another with the separator sandwiched therebetween.

The positive electrode, negative electrode, and separator may compose an electrode group. The electrode group may have various structures. For example, the electrode group may have a stacked structure. The electrode group having a stacked structure can be obtained by, for example, stacking a plural positive and negative electrodes, with a separator sandwiched between the positive and negative electrode material layers. Alternatively, the electrode group may have a wound structure. The wound electrode group can be obtained by, for example, by forming a stack by stacking a separator, a positive electrode, a separator, and a negative electrode in this order, and winding the laminate in a manner such that, for example, the negative electrode is located outside.

The nonaqueous electrolyte may be immersed in this electrode group.

The nonaqueous electrolyte battery according to an embodiment may further include a positive electrode terminal and negative electrode terminal.

The positive electrode terminal can function as a conductor for moving electrons between the positive electrode and external circuit, by a portion of it being electrically connected to a portion of the positive electrode. The positive electrode terminal may be connected to, for example, the positive electrode current collector, specifically the positive electrode tab. In the same manner, the negative electrode terminal can function as a conductor for moving electrons between the negative electrode and external terminal, by a portion of it being electrically connected to a portion of the negative electrode. The negative electrode terminal may be connected to, for example, the negative electrode current collector, specifically the negative electrode tab.

The nonaqueous electrolyte battery according to an embodiment may include a container member. The container member can house the electrode group and nonaqueous electrolyte. Portions of the positive and negative electrode terminals may be extended out from the container member.

Each component included in the nonaqueous electrolyte battery according to an embodiment are described below.

1) Negative Electrode

For the negative electrode current collector, for example, metal foil or alloy foil is used. The thickness of the current collector is 20 µm or less, more preferably 15 µm or less. Examples of metal foil include copper foil and aluminum foil. When aluminum foil is used, purity of the foil is preferably 99% by weight or more. Examples of alloy foil include stainless steel foil and aluminum alloy foil. The aluminum alloy in the aluminum alloy foil preferably includes at least one element selected from the group consisting of magnesium, zinc, and silicon. The amount of transition metal such as iron, copper, nickel, or chromium included in the alloy composition is preferably 1% by weight or less.

The negative electrode active material includes a first oxide represented by $Li_{4+a}Ti_5O_{12}$ ($-0.5 \leq a \leq 3$) and a second oxide of at least one element selected from the group consisting of Al, Co, Cr, Cu, Fe, Mg, Ni, Zn, and Zr. The negative electrode active material may include another active material other than the first and second oxides.

Examples of the other active material, which may be included in the negative electrode, include carbonaceous materials which can absorb and release lithium (e.g., graphite, hard carbon, soft carbon, and graphene), titanium-including oxides, sulfides, lithium nitrides, amorphous tin oxides such as $SnB_{0.4}P_{0.6}O_{3.1}$, tin silicon oxides such as $SnSiO_3$, silicon oxides such as $SiO$, and tungsten oxides such as $WO_3$. The negative electrode active material may be used alone or in combination of two or more kinds.

The titanium-including oxide, amorphous tin oxide, tin silicon oxide, silicon oxide, and tungsten oxide includes no lithium when these oxides are synthesized, but can include lithium by being charged.

Examples of the titanium-including oxide include anatase-type titanium-including oxides, rutile-type titanium-including oxides, bronze-type titanium-including oxides, ramsdellite-type titanium-including oxides, and metal composite oxides including Ti and at least one element selected from the group consisting of P, V, Sn, Cu, Ni, Nb, and Fe. Examples of the metal composite oxide including Ti and at least one element selected from the group consisting of P, V, Sn, Cu, Ni, Nb, and Fe include $TiO_2$—$P_2O_5$, $TiO_2$—$V_2O_5$, $TiO_2$—$P_2O_5$—$SnO_2$, $TiO_2$—$P_2O_5$-MeO (Me is at least one element selected from the group consisting of Cu, Ni, and Fe), and $Nb_2TiO_7$. The metal composite oxide has low crystallinity, and so, preferably has a microstructure where a crystal phase and an amorphous phase coincide, or where an amorphous phase exists alone. By having this microstructure, cycle performance can be improved markedly.

The composition of the anatase-type, rutile-type, bronze-type titanium-including oxide can be represented by $TiO_2$.

Examples of the ramsdellite-type titanium-including oxide include $Li_{2+y}Ti_3O_7$ (y is changed by charging and discharging reactions within the range of $-1 \leq y \leq 3$).

Examples of the sulfide include titanium sulfides such as $TiS_2$, molybdenum sulfides such as $MoS_2$, and iron sulfides such as $FeS$, $FeS_2$, and $Li_xFeS_2$ ($0 \leq x \leq 2$).

Examples of the lithium nitride include lithium cobalt nitrides (such as $Li_xCo_yN$, wherein $0<x<4$, and $0<y<0.5$).

The negative electrode active material may be included in the negative electrode as particles of negative electrode active material. The particles of negative electrode active material may be included in the negative electrode as primary particles, secondary particles formed by agglomeration of primary particles, or a mixture of primary and secondary particles. The primary particles of negative electrode active material may have an average particle size of, for example, from 0.01 µm to 10 µm. The secondary particles of negative electrode active material may have an average particle size of, for example, from 0.5 µm to 30 µm.

Examples of the conductive agent include carbon-including materials (e.g., acetylene black, Ketjen black, and graphite), and metal powder.

Examples of the binder include polytetrafluoroethylene (PTFE), polyvinylidene fluoride (PVdF), fluorine rubber, and styrene-butadiene rubber.

The negative electrode is manufactured by, for example, adding a conductive agent and a binder to powder-form negative electrode active material, suspending the mixture in an appropriate solvent, coating the suspension (slurry) onto a current collector, drying, and pressing to form band-shaped electrode.

The composition ratio of negative electrode active material, conductive agent, and binder is preferably in the range of 73 to 98% by weight of negative electrode active material, 0 to 20% by weight of conductive agent, and 2 to 7% by weight of binder.

2) Positive Electrode

The positive electrode active material includes the lithium manganese composite oxide represented by $Li_{1-x}Mn_{2-y-z}Al_yM_zO_4$. The positive electrode active material may include, in addition to the lithium manganese composite oxide, a lithium cobalt composite oxide represented by $Li_{1-x}Co_{1-b}M'_bO_2$. The positive electrode active material may include other kinds of active materials, aside from these.

Examples of other kinds of active material include various oxides and sulfides. For example, manganese dioxide ($MnO_2$), iron oxide, copper oxide, nickel oxide, $Li_xMn_2O_4$, $Li_xMnO_2$, lithium nickel composite oxide (e.g., $Li_xNiO_2$), lithium nickel cobalt composite oxide (e.g., $Li_xNi_{1-y-z}Co_yM_zO_2$ (M is at least one element selected from the group consisting of Al, Cr, and Fe, $0 \leq y \leq 0.5$, and $0 \leq z \leq 0.1$)), lithium manganese cobalt composite oxide (e.g., $Li_xMn_{1-y-z}Co_yM_zO_2$ (M is at least one element selected from the group consisting of Al, Cr, and Fe, $0 \leq y \leq 0.5$, and $0 \leq z \leq 0.1$)), lithium manganese nickel composite oxides (e.g., $Li_xMn_{1/2}Ni_{1/2}O_2$), lithium phosphorus oxides having an olivine structure (e.g., $Li_xFePO_4$, $Li_xFe_{1-y}Mn_yPO_4$, and $Li_xCoPO_4$), iron sulfates (e.g., $Fe_2(SO_4)_3$), and vanadium oxides (e.g., $V_2O_5$) may be included. Other examples include organic and inorganic materials such as conductive polymer materials such as polyaniline and polypyrrole, disulfide polymer materials, sulfur (S), and carbon fluoride. With regard to x, y, and z whose preferred ranges are not mentioned above, a range from 0 to 1 is preferable.

The positive electrode active material may be used alone or in combination of two or more kinds.

The positive electrode active material may be included in the positive electrode as particles of positive electrode active material. The particles of positive electrode active material may be included in the positive electrode as primary particles, secondary particles formed by agglomeration of primary particles, or a mixture of primary and secondary particles. The primary particles of positive electrode active material may have an average particle size of, for example, 0.05 nm or more and 10 μm or less. The secondary particles of positive electrode active material may have an average particle size of, for example, 0.5 μm or more and 30 μm or less.

Examples of the conductive agent include carbon black, graphite, graphene, fullerenes, and coke. Among them, carbon black and graphite are preferred. Examples of carbon black include acetylene black, Ketjen black, and furnace black.

Examples of the binder include polytetrafluoroethylene (PTFE), polyvinylidene fluoride (PVdF), polyacrylic acid, and fluorine rubber.

The positive electrode current collector is desirably formed of aluminum foil or aluminum alloy foil. The average crystal grain size of the aluminum foil and aluminum alloy foil is preferably 50 μm or less. More preferably, it is 30 μm or less. Even more preferably, it is 5 μm or less. When the average crystal grain size is 50 μm or less, the strength of the aluminum foil or aluminum alloy foil can be markedly increased, which allows the positive electrode to be made high in density using high pressing force, and thus battery capacity can be increased.

The thickness of the current collector is 20 μm or less, and more preferably 15 μm or less. The purity of the aluminum foil is preferably 99% by weight or more. As the aluminum alloy, an alloy including one or more elements selected from the group consisting of magnesium, zinc, and silicon is preferable. On the other hand, the amount of transition metal such as iron, copper, nickel, or chromium included is preferably 1% by weight or less.

The positive electrode is manufactured by, for example, adding a conductive agent and a binder to a positive electrode active material, suspending the mixture in an appropriate solvent, coating the suspension onto a current collector such as aluminum foil, drying, and pressing to form a band-shaped electrode.

The composition ratio of positive electrode active material, conductive agent, and binder is preferably in a range of 80 to 95% by weight of positive electrode active material, 3 to 20% by weight of conductive agent, and 2 to 7% by weight of binder.

3) Nonaqueous Electrolyte

The nonaqueous electrolyte may include a nonaqueous solvent, and an electrolyte salt dissolved in the nonaqueous solvent. In addition, the nonaqueous solvent may include a polymer.

Examples of the electrolyte salt include lithium salts such as $LiPF_6$, $LiBF_4$, $Li(CF_3SO_2)_2N$ (bistrifluoromethanesulfonylamide lithium; commonly known as LiTFSI), $LiCF_3SO_3$ (commonly known as LiTFS), $Li(C_2F_5SO_2)_2N$ (bispentafluoroethanesulfonylamide lithium; commonly known as LiBETI), $LiClO_4$, $LiAsF_6$, $LiSbF_6$, lithium bisoxalatoborate ($LiB(C_2O_4)_2$ (commonly known as LiBOB)), lithium difluoro(oxalato)borate ($LiF_2BC_2O_4$), lithium difluoro(trifluoro-2-oxide-2-trifluoro-methylpropionate(2-)-0,0) borate ($LiBF_2(OCOOC(CF_3)_2)$ (commonly known as $LiBF_2$(HHIB))), and lithium difluorophosphate ($LiPO_2F_2$). These electrolyte salts may be used alone or in combination of two or more kinds. In particular, $LiPF_6$, $LiBF_4$, lithium bisoxalatoborate ($LiB(C_2O_4)_2$ (commonly known as LiBOB)), lithium difluoro(oxalato) borate ($LiF_2BC_2O_4$), lithium difluoro(trifluoro-2-oxide-2-trifluoro-methylpropionate(2-)-0, 0) borate ($LiBF_2(OCOOC(CF_3)_2)$ (commonly known as $LiBF_2$(HHIB))), and lithium difluorophosphate ($LiPO_2F_2$) are preferred.

The concentration of the electrolyte salt is preferably from 0.5 M to 3 M. As such, performance can be improved when a high load current is applied.

The nonaqueous solvent is not particularly limited, and examples thereof include propylene carbonate (PC), ethylene carbonate (EC), 1,2-dimethoxyethane (DME), γ-butyrolactone (GBL), tetrahydrofuran (THF), 2-methyltetrahydrofuran (2-MeHF), 1,3-dioxolane, sulfolane, acetonitrile (AN), diethyl carbonate (DEC), dimethyl carbonate (DMC), methylethyl carbonate (MEC), and dipropyl carbonate (DPC). These solvents may be used alone or in combination of two or more kinds. When two or more solvents are used in combination, they are preferably selected from those having a dielectric constant of 20 or more.

An additive may be added to the nonaqueous electrolyte. The additive is not particularly limited, and examples thereof include vinylene carbonate (VC), fluorovinylene carbonate, methylvinylene carbonate, fluoro methylvinylene carbonate, ethyl vinylene carbonate, propyl vinylene carbonate, butyl vinylene carbonate, dimethylvinylene carbonate, diethyl vinylene carbonate, dipropyl vinylene carbonate, vinylene acetate (VA), vinyl butyrate, vinyl hexanate, vinyl crotonate, catechol carbonate, propane sultone, and butane sultone. These additives may be used alone or in combination of two or more kinds.

4) Separator

The material of the separator may be a single kind or two or more kinds may be used in combination. The material is not particularly limited, and examples thereof include at least one polymer selected from the group consisting of polyolefin, cellulose, polyester, polyvinyl alcohol, polyamide, polyimide, polytetrafluoroethylene, and vinylon.

The separator may be made of a porous film or nonwoven fabric. The porous film or nonwoven fabric may include inorganic particles.

5) Container Member

Used as the container member is a laminate film having a thickness or 0.5 mm or less or a metal container having a thickness of 3 mm or less. The thickness of the metal container is more preferably 0.5 mm or less. Alternatively, a resin container may be used. Examples of the material forming the resin container include polyolefin, polyvinyl chloride, a polystyrene resin, an acrylic resin, a phenolic resin, a polyphenylene resin, and a fluorocarbon resin.

Examples of the shape of the container member, that is, the battery shape include flat type (thin type), angular type, cylinder type, coin type, and button type. The battery can be applied to, for example, small size use for mounting on mobile electronic devices and the like, or for large size use for mounting on two-wheel to four-wheel automobiles and the like.

Used as the laminate film is a multilayer film where a metal layer is interposed between resin layers. The metal layer is, in order to lighten the weight, preferably aluminum foil or aluminum alloy foil. As the resin layer, a polymer material such as polypropylene (PP), polyethylene (PE), nylon, polyethylene terephthalate (PET), or the like may be used. The laminate film may be molded into the shape of the container member by heat sealing.

The metal container is made of aluminum, an aluminum alloy, or the like. The aluminum alloy preferably includes at least one element selected from the group consisting of magnesium, zinc, and silicon. In the case that a transition metal such as iron, copper, nickel, or chromium is included in the alloy, its amount is preferably 100 ppm or less.

6) Negative Electrode Terminal

The negative electrode terminal may be formed from aluminum or an aluminum alloy including at least one element selected from the group consisting of Mg, Ti, Zn, Mn, Fe, Cu, and Si. The negative electrode terminal is preferably formed from the same material as the negative electrode current collector, in order to reduce contact resistance to the negative electrode current collector.

7) Positive Electrode Terminal

The positive electrode terminal is preferably formed from aluminum or an aluminum alloy including at least one element selected from the group consisting of Mg, Ti, Zn, Ni, Cr, Mn, Fe, Cu, and Si. The positive electrode terminal is preferably formed from the same material as the positive electrode current collector, in order to reduce contact resistance to the positive electrode current collector.

FIG. 1 shows an example of the nonaqueous electrolyte battery according to an embodiment. The battery shown in FIG. 1 is a closed type angular nonaqueous electrolyte battery. The nonaqueous electrolyte battery includes a container can 1, a lid 2, a positive electrode external terminal 3, a negative electrode external terminal 4, and an electrode group 5. The container member is composed of the container can 1 and the lid 2.

The container can 1 has a bottomed square tubular shape, and formed of, for example, a metal such as aluminum, an aluminum alloy, iron, or stainless steel.

As shown in FIG. 2, the flat electrode group 5 is one where a positive electrode 6 and a negative electrode 7, with a separator 8 interposed therebetween, has been wound into a flat shape. The positive electrode 6 includes a band-shaped positive electrode current collector made of, for example, metal foil, a positive electrode current collecting tab 6a formed of one end of the positive electrode current collector parallel to the long side, and a positive electrode material layer (positive electrode active material-including layer) 6b formed on the positive electrode current collector excluding at least the portion of the positive electrode current collecting tab 6a. On the other hand, the negative electrode 7 includes a band-shaped negative electrode current collector made of, for example, metal foil, a negative electrode current collecting tab 7a formed of one end of the negative electrode current collector parallel to the long side, and a negative electrode material layer (negative electrode active material-including layer) 7b formed on the negative electrode current collector excluding at least the portion of the negative electrode current collecting tab 7a.

These positive electrode 6, separator 8, and negative electrode 7 are wound in a manner such that the positions of the positive electrode 6 and negative electrode 7 are shifted from each other so that the positive electrode current collecting tab 6a protrudes from the separator 8 in a direction along the winding axis of the electrode group, and the negative electrode current collecting tab 7a protrudes from the separator 8 in the opposite direction. As a result of this winding, in the electrode group 5, as shown in FIG. 2, the spirally wound positive electrode current collecting tab 6a protrudes from one side, and the spirally wound negative electrode current collecting tab 7a protrudes from the other side. The electrode group 5 is immersed in an electrolyte solution (not shown).

As shown in FIG. 1, the positive electrode current collecting tab 6a and negative electrode current collecting tab 7a are divided into two bundles, bordered near the winding center of the electrode group. The conductive clipping member 9 has first and second clipping parts 9a and 9b that are approximately U-shaped, and a connection part 9c electrically connecting the first clipping part 9a and the second clipping part 9b. In each of the positive and negative electrode current collecting tabs 6a and 7a, respectively, one bundle is clipped together by the first clipping part 9a, and the other bundle is clipped together by the second clipping part 9b.

A positive electrode lead 10 has an approximately rectangular supporting plate 10a, a through hole 10b opened in the supporting plate 10a, and strip-shaped current collecting parts 10c and 10d which are bifurcated from the supporting plate 10a and extend downwards. On the other hand, a negative electrode lead 11 has an approximately rectangular supporting plate 11a, a through hole 11b opened in the supporting plate 11a, and strip-shaped current collecting parts 11c and 11d which are bifurcated from the supporting plate 11a and extend downwards.

The positive electrode lead 10 sandwiches the clipping member 9 between the current collecting parts 10c and 10d. The current collecting part 10c is positioned on the first clipping part 9a of the clipping member 9. The current collecting part 10d is positioned on the second clipping part 9b. The current collecting parts 10c and 10d, the first and second clipping parts 9a and 9b, and the positive electrode current collecting tab 6a are welded together by, for example, ultrasonic welding. As a result of this, the positive electrode 6 of the electrode group 5 and the positive electrode lead 10 are electrically connected to each other through the positive electrode current collecting tab 6a.

The negative electrode lead 11 sandwiches the clipping member 9 between the current collecting parts 11c and 11d. The current collecting part 11c is positioned on the first clipping part 9a of the clipping member 9. The current collecting part 11d is positioned on the second clipping part 9b. The current collecting parts 11c and 11d, the first and second clipping parts 9a and 9b, and the negative electrode current collecting tab 7a are welded together by, for example, ultrasonic welding. As a result of this, the negative electrode 7 of the electrode group 5 and the negative electrode lead 11 are electrically connected to each other through the negative electrode current collecting tab 7a.

The material of the positive and negative electrode leads 10, 11, and the clipping member 9 are not specified, but is desirably the same as that of the positive and negative electrode external terminals 3 and 4. The positive electrode external terminal 3 is made of, for example, aluminum or an aluminum alloy, and the negative electrode external terminal 4 is made of, for example, aluminum, an aluminum alloy, copper, nickel, or nickel-plated iron. For example, when the material of the external terminal is made of aluminum or an aluminum alloy, the material of the lead is preferably aluminum or an aluminum alloy. Alternatively, when the external terminal is made of copper, the material of the lead is desirably copper.

The lid 2 of rectangular plate shape is, for example, seam welded by laser to the opening of the container can 1. The lid 2 is made of, for example, a metal such as aluminum, an aluminum alloy, iron, or stainless steel. The lid 2 and the container can 1 are preferably made of the same metal. The positive electrode external terminal 3 is electrically connected to the supporting plate 10a of the positive electrode lead 10, and the negative electrode external terminal 4 is electrically connected to the supporting plate 11a of the negative electrode lead 11. An electrical insulation gasket 12 is disposed between the positive and negative electrode external terminals 3, 4 and the lid 2, and electrically insulates the negative electrode external terminals 3, 4 from the lid 2. The electrical insulation gasket 12 is desirably a resin molding.

According to the first embodiment described above, the nonaqueous electrolyte battery includes a positive electrode including $Li_{1-x}Mn_{2-y-z}Al_yM_zO_4$ and a negative electrode including a first oxide represented by $Li_{4+a}Ti_5O_{12}$ and a second oxide of at least one element selected from the group consisting of Al, Co, Cr, Cu, Fe, Mg, Ni, Zn, and Zr in an amount of from 300 ppm to 5000 ppm relative to the weight of the first oxide. The nonaqueous electrolyte battery has excellent charging and discharging cycle performance and a low amount of gas generation.

Second Embodiment

According to second embodiment, a battery pack including a nonaqueous electrolyte battery is provided. Used as the nonaqueous electrolyte battery is the nonaqueous electrolyte battery according to the first embodiment. The number of the nonaqueous electrolyte battery (single cell) included in the battery pack may be one or more. When plural single cells are included, these single cells are electrically connected to each other in series or in parallel.

The battery pack is described in detail with reference to FIG. 3. Plural single cells 21 are electrically connected to each other in series to compose a battery module 22. A positive electrode side lead 23 is connected to the positive electrode terminal of the battery module 22, and its tip is inserted into and electrically connected to a positive electrode side connector 24. A negative electrode side lead 25 is connected to the negative electrode terminal of the battery module 22, and its tip is inserted into and electrically connected to a negative electrode side connector 26. These connectors 24 and 26 are connected to a protection circuit 29 through the wiring 27 and 28.

The thermistor 30 detects the temperature of the single cells 21, and the detection signal is transmitted to the protection circuit 29. The protection circuit 29 can, under predetermined conditions, block the positive side wiring 32a and negative side wiring 32b between the protection circuit 29 and conductive terminal 31 for passing current to the external equipment. Predetermined conditions are when, for example, the detected temperature of the thermistor 30 reaches a predetermined temperature or higher. Alternatively, the predetermined conditions are when overcharge, overdischarge, or overcurrent of the single cells 21 is detected. Detection of the overcharge and the like is carried out for each of the single cells 21 or the whole of the single cells 21. When each of the single cells 21 is detected, the battery voltage may be detected, or the electric potential of the positive or negative electrode may be detected. In the latter case, a lithium electrode used as a reference electrode is inserted to each of the single cells 21. In the case shown in FIG. 3, wiring 33 for detecting the voltage is connected to each of the single cells 21, and the detection signal is transmitted to the protection circuit 29 through the wiring 33.

Figure 3:
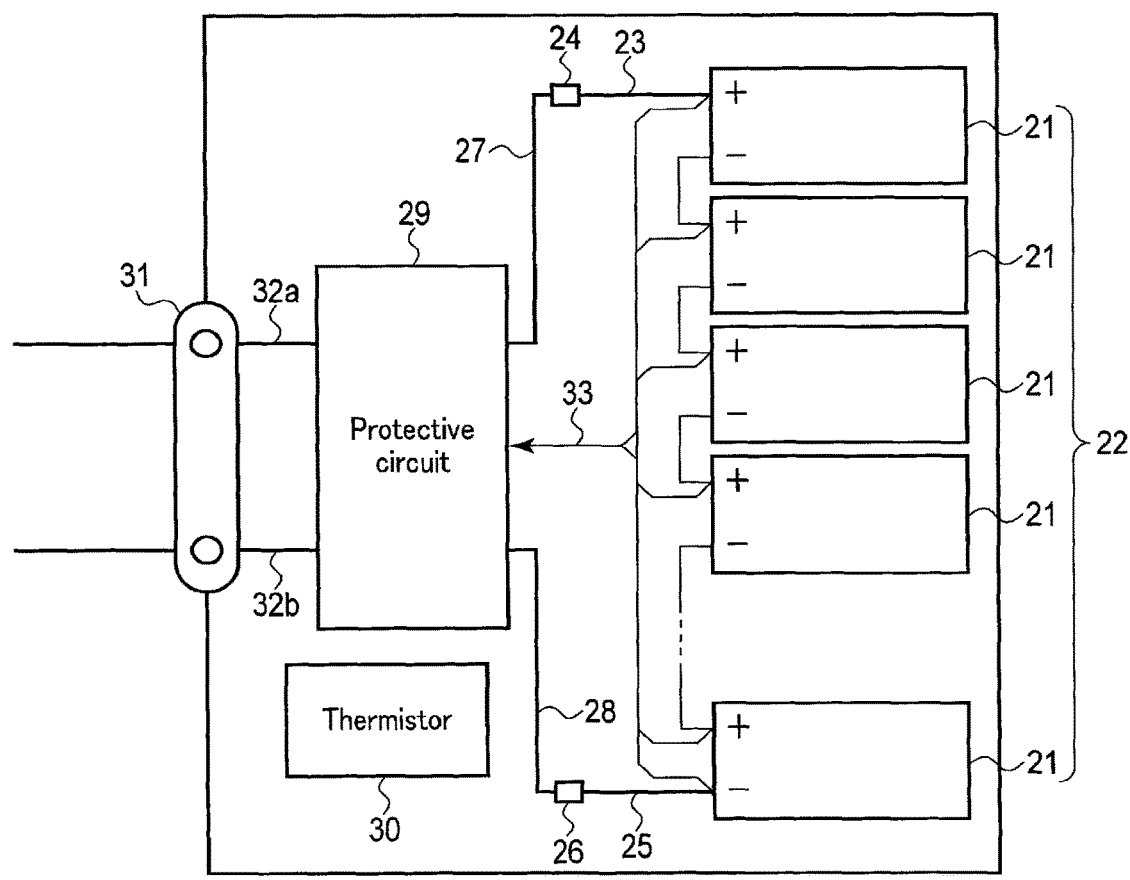
FIG. 3 is a block diagram showing an electric circuit of a battery pack according to an embodiment.

In FIG. 3, an embodiment is indicated where the single cells 21 are connected in series, however, in order to increase battery capacity, connection may be made in parallel. Assembled battery packs may be connected in series or in parallel, as well.

Embodiment of the battery pack is appropriately changed according to the intended use. Preferable uses of the battery pack are those where cycling characteristics are desired with large current characteristics. Specific examples include power sources for digital cameras, and for mounting on vehicles such as two to four-wheeled hybrid electric cars, two to four-wheeled electric cars, and assist bicycles. In particular, use for mounting on vehicles is preferred.

According the second embodiment described above, the battery pack includes the nonaqueous electrolyte battery of the first embodiment is included. The battery pack has excellent charging and discharging cycle performance and a low amount of gas generation.

EXAMPLES

Examples are described below, but the present invention is not limited to the following examples, so long as it does not depart from the scope of the present invention.

Example 1

<Manufacture of Positive Electrode>

As positive electrode active materials, particles of a lithium manganese composite oxide $LiMn_{1.7}Al_{0.3}O_4$ with an average particle size of 10 μm and a lithium cobalt composite oxide $LiCoO_2$ with an average particle size of 10 μm were prepared. As a conductive agent, graphite and acetylene black were prepared. As a binder, polyvinylidene fluoride (PVdF) was prepared. Subsequently, the positive electrode active materials, graphite, acetylene black, and PVdF were mixed to obtain a mixture. At this time, proportion of the lithium manganese composite oxide and lithium cobalt composite oxide in the positive electrode active material was made to be such that the ratio $W_1/W_2$ of the weight of lithium cobalt composite oxide to the weight of lithium manganese composite oxide would be 0.1. Graphite was added such that its proportion would be 2.5% by weight relative to the entire positive electrode to be manufactured. Acetylene black was added such that its proportion would be 2.5% by weight relative to the entire positive electrode to be manufactured. PVdF was added such that its proportion would be 5% by weight relative to the entire positive electrode to be manufactured. Subsequently, the mixture thus obtained was dispersed in an n-methylpyrrolidone (NMP) solvent to prepare a slurry. The obtained slurry was coated onto aluminum foil of 15 μm thickness such that a coating amount per unit area would be 80 g/m², and dried. Subsequently, the dried coating was pressed. Thus was obtained a positive electrode where the weight based on area and density of the positive electrode material layer was 80 g/m² and 3 g/cm³, respectively.

<Manufacture of Negative Electrode>

As a negative electrode active material, a spinel-type lithium titanium composite oxide $Li_4Ti_5O_{12}$ including 400 ppm of $ZrO_2$ was prepared by the following method. First, ethanol as a dispersion medium was prepared, and $Li_4Ti_5O_{12}$ particles with an average secondary particle size of 3 μm were added into the dispersion medium. To this mixed solution were added $ZrO_2$ particles with an average primary particle size of 0.5 μm in an amount of 400 ppm relative to the weight of $Li_4Ti_5O_{12}$ particles, and the mixed solution was thoroughly stirred using a magnetic stirrer. The obtained suspension was filtered to remove the dispersion medium, dried at 500° C., and then subjected to grinding and classification.

As a conductive agent, graphite was prepared. As a binder, PVdF was prepared. Subsequently, the negative electrode active material, graphite, and PVdF were mixed to obtain a mixture. At this time, graphite was added such that its proportion would be 3% by weight relative to the entire negative electrode to be manufactured. PVdF was added such that its proportion would be 2% by weight relative to the entire negative electrode to be manufactured. Subsequently, the obtained mixture was blended in an n-methylpyrrolidone (NMP) solution to prepare a slurry. The obtained slurry was coated onto a current collector made of aluminum foil of 15 μm thickness such that a coating weight per unit area would be 120 g/m², and dried. Subsequently, the dried coating was pressed to form a negative electrode material layer on the current collector. Thus was obtained a band-shaped negative electrode, where the weight based on area and density of the negative electrode material layer was 120 g/m² and 2.1 g/cm³, respectively.

<Preparation of Nonaqueous Electrolyte>

To a nonaqueous solvent composed of 33% by volume of ethylene carbonate (EC) and 67% by volume of diethyl carbonate (DEC), 1 M of $LiPF_6$ was dissolved to thereby prepare a nonaqueous electrolyte solution as a nonaqueous electrolyte.

<Assembly of Battery>

A separator made of polyester nonwoven fabric having a thickness of 20 μm was prepared. The separator was impregnated with the prepared nonaqueous electrolyte. Subsequently, the manufactured positive electrode was covered with the separator, and then the manufactured negative electrode was stacked so as to face opposite to the positive electrode with the separator interposed therebetween, thereby obtaining a stack. This stack was spirally wound, thereby manufacturing a spiral electrode group. This electrode group was subjected to pressing and formed into a flat shape.

This flat electrode group was inserted into a can of bottomed square tubular shape made of aluminum having a thickness of 0.3 mm, and sealed with a lid. In this manner, a flat nonaqueous electrolyte secondary battery having a thickness of 5 mm, a width of 30 mm, a height of 25 mm, and a weight of 100 g was made.

The area of the positive electrode area CA in the electrode group was 24000 cm². The rated capacity of the battery was 12 Ah.

Examples 2 to 9

Nonaqueous electrolyte batteries of Examples 2 to 9 were manufactured in the same manner as in Example 1, except that the type of oxide added to the negative electrode active material was changed as shown in Table 1 below.

Examples 10 to 12

Nonaqueous electrolyte batteries of Examples 10 to 12 were manufactured in the same manner as in Example 1, except that the addition amount of $ZrO_2$ in the negative electrode active material was changed as shown in Table 1 below.

Examples 13 to 16

Nonaqueous electrolyte batteries of Examples 13 to 16 were manufactured in the same manner as in Example 1, except that proportions of weight of the lithium manganese composite oxide and lithium cobalt composite oxide as positive electrode active materials, that is, ratio $W_1/W_2$ was changed as shown in Table 1 below.

Examples 17 to 29

Nonaqueous electrolyte batteries of Examples 17 to 29 were manufactured in the same manner as in Example 1, except that the kind of lithium manganese composite oxide as a positive electrode active material was changed as shown in Table 1 below.

Example 30 to 41

Nonaqueous electrolyte batteries of Examples 30 to 41 were manufactured in the same manner as in Example 1, except that the kind of lithium cobalt composite oxide as a positive electrode active material was changed as shown in Table 2 below.

Comparative Examples 1 to 4

Nonaqueous electrolyte batteries of Comparative Examples 1 to 4 were manufactured in the same manner as in Example 1, except that the kind of lithium manganese composite oxide as a positive electrode active material and the addition amount of $ZrO_2$ in the negative electrode active material were changed as shown in Table 2 below.

Comparative Examples 5, 6

Nonaqueous electrolyte batteries of Comparative Examples 5 and 6 were manufactured in the same manner as in Example 1, except that the positive electrode active material was changed to lithium cobalt composite oxide alone, and the addition amount of $ZrO_2$ in the negative electrode active material was changed as shown in Table 2 below.

Comparative Examples 7, 8

Nonaqueous electrolyte batteries of Comparative Examples 7 and 8 were manufactured in the same manner as in Example 1, except that the positive electrode active material was changed to single species of lithium manganese cobalt composite oxide, and the addition amount of $ZrO_2$ in the negative electrode active material was changed as shown in Table 2 below.

Examples 42, 43 and Comparative Examples 9, 10

Nonaqueous electrolyte batteries of Examples 42, 43 and Comparative Examples 9, 10 were manufactured in the same manner as in Example 1, except that the coating amount of the positive electrode slurry was adjusted to change CA as shown in Table 3 below.

TABLE 1

|  | Positive Electrode Active Material 1 | Positive Electrode Active Material 2 | $W_1/W_2$ | Negative Electrode Additive Oxide |
|---|---|---|---|---|
| Example 1 | $LiMn_{1.7}Al_{0.3}O_4$ | $LiCoO_2$ | 0.1 | $ZrO_2$ 400 ppm |
| Example 2 | $LiMn_{1.7}Al_{0.3}O_4$ | $LiCoO_2$ | 0.1 | $Al_2O_3$ 400 ppm |
| Example 3 | $LiMn_{1.7}Al_{0.3}O_4$ | $LiCoO_2$ | 0.1 | $ZnO_2$ 400 ppm |
| Example 4 | $LiMn_{1.7}Al_{0.3}O_4$ | $LiCoO_2$ | 0.1 | $CuO$ 400 ppm |
| Example 5 | $LiMn_{1.7}Al_{0.3}O_4$ | $LiCoO_2$ | 0.1 | $Co_3O_4$ 400 ppm |
| Example 6 | $LiMn_{1.7}Al_{0.3}O_4$ | $LiCoO_2$ | 0.1 | $Fe_2O_3$ 400 ppm |
| Example 7 | $LiMn_{1.7}Al_{0.3}O_4$ | $LiCoO_2$ | 0.1 | $MgO_2$ 400 ppm |
| Example 8 | $LiMn_{1.7}Al_{0.3}O_4$ | $LiCoO_2$ | 0.1 | $Cr_2O_3$ 400 ppm |
| Example 9 | $LiMn_{1.7}Al_{0.3}O_4$ | $LiCoO_2$ | 0.1 | $NiO$ 400 ppm |
| Example 10 | $LiMn_{1.7}Al_{0.3}O_4$ | $LiCoO_2$ | 0.1 | $ZrO_2$ 300 ppm |
| Example 11 | $LiMn_{1.7}Al_{0.3}O_4$ | $LiCoO_2$ | 0.1 | $ZrO_2$ 1000 ppm |
| Example 12 | $LiMn_{1.7}Al_{0.3}O_4$ | $LiCoO_2$ | 0.1 | $ZrO_2$ 5000 ppm |
| Example 13 | $LiMn_{1.7}Al_{0.3}O_4$ | $LiCoO_2$ | 0 | $ZrO_2$ 400 ppm |
| Example 14 | $LiMn_{1.7}Al_{0.3}O_4$ | $LiCoO_2$ | 0.03 | $ZrO_2$ 400 ppm |
| Example 15 | $LiMn_{1.7}Al_{0.3}O_4$ | $LiCoO_2$ | 0.25 | $ZrO_2$ 400 ppm |
| Example 16 | $LiMn_{1.7}Al_{0.3}O_4$ | $LiCoO_2$ | 0.5 | $ZrO_2$ 400 ppm |
| Example 17 | $LiMn_{1.8}Al_{0.2}O_4$ | $LiCoO_2$ | 0.1 | $ZrO_2$ 400 ppm |
| Example 18 | $LiMn_{1.65}Al_{0.35}O_4$ | $LiCoO_2$ | 0.1 | $ZrO_2$ 400 ppm |
| Example 19 | $LiMn_{1.65}Al_{0.3}Co_{0.05}O_4$ | $LiCoO_2$ | 0.1 | $ZrO_2$ 400 ppm |
| Example 20 | $LiMn_{1.65}Al_{0.3}Zr_{0.05}O_4$ | $LiCoO_2$ | 0.1 | $ZrO_2$ 400 ppm |
| Example 21 | $LiMn_{1.65}Al_{0.3}Zn_{0.05}O_4$ | $LiCoO_2$ | 0.1 | $ZrO_2$ 400 ppm |
| Example 22 | $LiMn_{1.65}Al_{0.3}Mg_{0.05}O$ | $LiCoO_2$ | 0.1 | $ZrO_2$ 400 ppm |
| Example 23 | $LiMn_{1.65}Al_{0.3}Ni_{0.05}O_4$ | $LiCoO_2$ | 0.1 | $ZrO_2$ 400 ppm |
| Example 24 | $LiMn_{1.65}Al_{0.3}Ti_{0.05}O_4$ | $LiCoO_2$ | 0.1 | $ZrO_2$ 400 ppm |
| Example 25 | $LiMn_{1.65}Al_{0.3}Cr_{0.05}O_4$ | $LiCoO_2$ | 0.1 | $ZrO_2$ 400 ppm |
| Example 26 | $LiMn_{1.65}Al_{0.3}Sn_{0.05}O_4$ | $LiCoO_2$ | 0.1 | $ZrO_2$ 400 ppm |
| Example 27 | $LiMn_{1.65}Al_{0.3}Cu_{0.05}O_4$ | $LiCoO_2$ | 0.1 | $ZrO_2$ 400 ppm |
| Example 28 | $LiMn_{1.65}Al_{0.3}Mo_{0.05}O$ | $LiCoO_2$ | 0.1 | $ZrO_2$ 400 ppm |
| Example 29 | $LiMn_{1.65}Al_{0.3}Nb_{0.05}O_4$ | $LiCoO_2$ | 0.1 | $ZrO_2$ 400 ppm |

TABLE 2

|  | Positive Electrode Active Material 1 | Positive Electrode Active Material 2 | $W_1/W_2$ | Negative Electrode Additive Oxide |
|---|---|---|---|---|
| Example 30 | $LiMn_{1.7}Al_{0.3}O_4$ | $LiCo_{0.95}Ni_{0.05}O_2$ | 0.1 | $ZrO_2$ 400 ppm |
| Example 31 | $LiMn_{1.7}Al_{0.3}O_4$ | $LiCo_{0.95}Mn_{0.05}O$ | 0.1 | $ZrO_2$ 400 ppm |
| Example 32 | $LiMn_{1.7}Al_{0.3}O_4$ | $LiCo_{0.95}Al_{0.05}O_2$ | 0.1 | $ZrO_2$ 400 ppm |
| Example 33 | $LiMn_{1.7}Al_{0.3}O_4$ | $LiCo_{0.95}Mg_{0.05}O$ | 0.1 | $ZrO_2$ 400 ppm |
| Example 34 | $LiMn_{1.7}Al_{0.3}O_4$ | $LiCo_{0.95}Cu_{0.05}O$ | 0.1 | $ZrO_2$ 400 ppm |
| Example 35 | $LiMn_{1.7}Al_{0.3}O_4$ | $LiCo_{0.95}Zn_{0.05}O$ | 0.1 | $ZrO_2$ 400 ppm |
| Example 36 | $LiMn_{1.7}Al_{0.3}O_4$ | $LiCo_{0.95}Zr_{0.05}O_2$ | 0.1 | $ZrO_2$ 400 ppm |
| Example 37 | $LiMn_{1.7}Al_{0.3}O_4$ | $LiCo_{0.95}Fe_{0.05}O$ | 0.1 | $ZrO_2$ 400 ppm |
| Example 38 | $LiMn_{1.7}Al_{0.3}O_4$ | $LiCo_{0.95}Sn_{0.05}O$ | 0.1 | $ZrO_2$ 400 ppm |
| Example 39 | $LiMn_{1.7}Al_{0.3}O_4$ | $LiCo_{0.95}Mo_{0.05}O$ | 0.1 | $ZrO_2$ 400 ppm |
| Example 40 | $LiMn_{1.7}Al_{0.3}O_4$ | $LiCo_{0.95}Cr_{0.05}O_2$ | 0.1 | $ZrO_2$ 400 ppm |
| Example 41 | $LiMn_{1.7}Al_{0.3}O_4$ | $LiCo_{0.95}Ti_{0.05}O_2$ | 0.1 | $ZrO_2$ 400 ppm |
| Comparative Example 1 | $LiMn_{1.9}Al_{0.3}O_4$ | $LiCoO_2$ | 0.1 | $ZrO_2$ 100 ppm |
| Comparative Example 2 | $LiMn_{1.7}Al_{0.3}O_4$ | $LiCoO_2$ | 0.1 | $ZrO_2$ 100 ppm |

TABLE 2-continued

|  | Positive Electrode Active Material 1 | Positive Electrode Active Material 2 | $W_1/W_2$ | Negative Electrode Additive Oxide |
|---|---|---|---|---|
| Comparative Example 3 | $LiMn_{1.9}Al_{0.3}O_4$ | $LiCoO_2$ | 0.1 | $ZrO_2$ 400 ppm |
| Comparative Example 4 | $LiMn_{1.7}Al_{0.3}O_4$ | $LiCoO_2$ | 0.1 | $ZrO_2$ 10000 ppm |
| Comparative Example 5 | $LiCoO_2$ | Non | ∞ | $ZrO_2$ 400 ppm |
| Comparative Example 6 | $LiCoO_2$ | Non | ∞ | $ZrO_2$ 100 ppm |
| Comparative Example 7 | $LiNi_{0.4}Co_{0.3}Mn_{0.3}O_2$ | Non | — | $ZrO_2$ 400 ppm |
| Comparative Example 8 | $LiNi_{0.4}Co_{0.3}Mn_{0.3}O_2$ | Non | — | $ZrO_2$ 100 ppm |

TABLE 3

|  | A [Ah] | CA [$cm^2$] | CA/A [$cm^2$/Ah] |
|---|---|---|---|
| Example 1 | 12 | 24000 | 2000 |
| Example 42 | 12 | 9600 | 800 |
| Example 43 | 12 | 48000 | 4000 |
| Comparative Example 9 | 12 | 8400 | 700 |
| Comparative Example 10 | 12 | 60000 | 5000 |

<Cycle Test>

The obtained batteries were subjected to 3000 cycles of charging to 2.7 V then discharging to 1.5 V at a 1C current in an 80° C. environment. The proportion that the discharge capacity of the 3000th cycle had decreased in comparison to the discharge capacity of the first cycle was determined, and the results are shown in Tables 4 to 6.

(Gas Generation Amount)

The gas generation amount was estimated from the difference between the cell thickness measured at 25° C. after the cycle test and the cell thickness before the test. The results are shown in Tables 4 to 6.

TABLE 4

|  | Battery Resistance (Example 1 normalized to 100) | Resistance Increase Rate [%] | Capacity Degradation [%] | Gas Generation Amount [Ah/mL] |
|---|---|---|---|---|
| Example 1 | 100 | 50 | 2 | 0.1 |
| Example 2 | 98 | 60 | 4 | 0.1 |
| Example 3 | 100 | 65 | 5 | 0.2 |
| Example 4 | 100 | 70 | 3 | 0.2 |
| Example 5 | 102 | 70 | 2 | 0.1 |
| Example 6 | 103 | 60 | 5 | 0.1 |
| Example 7 | 100 | 65 | 3 | 0.2 |
| Example 8 | 98 | 65 | 3 | 0.1 |
| Example 9 | 100 | 65 | 4 | 0.1 |
| Example 10 | 97 | 60 | 4 | 0.1 |
| Example 11 | 110 | 45 | 2 | 0.1 |
| Example 12 | 130 | 40 | 3 | 0.1 |
| Example 13 | 100 | 60 | 2 | 0.4 |
| Example 14 | 100 | 55 | 2 | 0.2 |
| Example 15 | 95 | 50 | 5 | 0.1 |
| Example 16 | 95 | 50 | 10 | 0.1 |
| Example 17 | 95 | 70 | 5 | 0.2 |
| Example 18 | 110 | 50 | 1 | 0.1 |
| Example 19 | 110 | 60 | 2 | 0.1 |
| Example 20 | 110 | 60 | 2 | 0.2 |
| Example 21 | 120 | 55 | 2 | 0.1 |
| Example 22 | 110 | 60 | 2 | 0.1 |
| Example 23 | 115 | 65 | 3 | 0.1 |
| Example 24 | 110 | 70 | 2 | 0.1 |
| Example 25 | 105 | 60 | 2 | 0.1 |
| Example 26 | 110 | 65 | 3 | 0.2 |
| Example 27 | 110 | 55 | 2 | 0.1 |
| Example 28 | 120 | 60 | 2 | 0.2 |
| Example 29 | 115 | 60 | 2 | 0.1 |

TABLE 5

|  | Battery Resistance (Example 1 normalized to 100) | Resistance Increase Rate [%] | Capacity Degradation [%] | Gas Generation Amount [Ah/mL] |
|---|---|---|---|---|
| Example 30 | 105 | 45 | 2 | 0.2 |
| Example 31 | 110 | 50 | 2 | 0.1 |
| Example 32 | 110 | 45 | 2 | 0.2 |
| Example 33 | 115 | 55 | 3 | 0.2 |
| Example 34 | 110 | 60 | 3 | 0.2 |
| Example 35 | 105 | 60 | 2 | 0.1 |
| Example 36 | 105 | 65 | 3 | 0.1 |
| Example 37 | 120 | 45 | 2 | 0.1 |
| Example 38 | 110 | 55 | 4 | 0.2 |
| Example 39 | 115 | 50 | 3 | 0.1 |
| Example 40 | 120 | 60 | 3 | 0.2 |
| Example 41 | 110 | 55 | 2 | 0.2 |
| Comparative Example 1 | 90 | 300 | 20 | 0.3 |
| Comparative Example 2 | 95 | 100 | 5 | 4.0 |
| Comparative Example 3 | 110 | 200 | 15 | 0.2 |
| Comparative Example 4 | 300 | 40 | 3 | 0.1 |
| Comparative Example 5 | 100 | 50 | 40 | 0.1 |
| Comparative Example 6 | 95 | 50 | 40 | 0.1 |
| Comparative Example 7 | 100 | 70 | 30 | 1.0 |
| Comparative Example 8 | 95 | 70 | 30 | 1.0 |

TABLE 6

| | Battery Resistance (Example 1 normalized to 100) | Resistance Increase Rate [%] | Capacity Degradation [%] | Gas Generation Amount [Ah/mL] |
|---|---|---|---|---|
| Example 1 | 100 | 50 | 2 | 0.1 |
| Example 42 | 220 | 20 | 2 | 0.1 |
| Example 43 | 50 | 70 | 5 | 0.5 |
| Comparative Example 9 | 320 | 15 | 2 | 0.1 |
| Comparative Example10 | 45 | 90 | 10 | 1.0 |

As shown in Tables 4 and 5, when the battery resistance before the cycle test in Example 1 was expressed as 100, battery resistance in Examples 1 to 41 was from 95 to 130. The increase rate of battery resistance after the cycle test in Examples 1 to 41 was from 45% to 70% as shown in Tables 4 and 5.

The proportion that the discharge capacity had decreased from before to after subjecting the nonaqueous electrolyte batteries of Examples 1 to 41 to charging and discharging cycles, that is, capacity degradation was from 1% to 10% as shown in Tables 4 and 5.

The amount of gas generated, when the nonaqueous electrolyte batteries of Examples 1 to 41 were subjected to charging and discharging cycles, was from 0.1 Ah/ml to 0.4 Ah/ml as shown in Tables 4 and 5.

As described above, the nonaqueous electrolyte batteries of Examples 1 to 41 is able to both make the increase in battery resistance low and make the amount of gas generated low. Furthermore, capacity degradation due to subjecting the nonaqueous electrolyte batteries to charging and discharging cycles was small.

On the other hand, as shown in Table 5, the nonaqueous electrolyte batteries of Comparative Examples 1 to 8 were inferior to the nonaqueous electrolyte batteries of Examples 1 to 41 in at least one of battery resistance, resistance increase rate, capacity degradation, or gas generation amount.

In the nonaqueous electrolyte batteries of Comparative Examples 1 and 3, the resistance increase rate was as high as 200 to 300%. The resistance increase rate is likely to have become high due to the amount of Al substitution being small (y=0.1) in the lithium manganese composite oxide $LiMn_{1.9}Al_{0.1}O_4$ used as a positive electrode active material in the nonaqueous electrolyte batteries of Comparative Examples 1 and 3, and improvement of the crystal structure being insufficient.

In the nonaqueous electrolyte battery of Comparative Example 2, although the resistance increase rate was 100% and relatively small, the gas generation amount was as high as 4.0 Ah/ml. It can be considered that in the nonaqueous electrolyte battery of Comparative Example 2, the same positive electrode active material as that of Example 1 was used, so that the crystal structure was improved and Mn elution was reduced, but on the contrary, the addition amount of the second oxide $ZrO_2$ as an additive to the negative electrode was as low as 100 ppm, so that a large amount of gas had generated from the negative electrode.

The nonaqueous electrolyte battery of Comparative Example 4 achieved the same level of performance as the nonaqueous electrolyte batteries of Examples 1 to 41 in the resistance increase rate, gas generation amount, and capacity degradation. However, in the nonaqueous electrolyte battery of Comparative Example 4, the original battery resistance before subjecting to charging and discharging cycles was as high as 300 (considering the battery resistance in Example 1 as being 100). This can be considered to be that in Comparative Example 4, the addition amount of the second oxide $ZrO_2$ in the negative electrode was as high as 10,000 ppm, so that the battery resistance had become high.

In the nonaqueous electrolyte batteries of Comparative Examples 5 and 6, although the resistance increase and gas generation amount were about the same level as those of the nonaqueous electrolyte batteries of Examples 1 to 41, the capacity degradation was as high as 40%. This is considered to be that in Comparative Examples 5 and 6, lithium manganese composite oxide was not used as the positive electrode active material, and lithium cobalt composite oxide was included alone.

In the nonaqueous electrolyte batteries of Comparative Examples 7 and 8, although the resistance increase rate and gas generation amount were about the same level as those of the nonaqueous electrolyte batteries of Examples 1 to 41, the capacity degradation was as high as 30%. This is considered to be that in Comparative Examples 7 and 8, only a single species of lithium manganese cobalt composite oxide was included as the positive electrode active material. That is, in contrast to lithium manganese composite oxide, lithium manganese cobalt composite oxide does not have a stable crystal structure, and therefore unable to reduce capacity degradation.

As shown in Table 6, the results of Examples 1, 42, and 43 indicate that about the same level of performance as that of the nonaqueous electrolyte batteries of Examples 1 to 41 can be exhibited even if the ratio CA/A of the area of the positive electrode to the rated capacity of the nonaqueous electrolyte battery is changed in the range of from 800 to 4000.

On the other hand, in the nonaqueous electrolyte battery of Comparative Example 9, the original battery resistance before subjecting to charging and discharging cycles was as high as 320 (considering the battery resistance in Example 1 as being 100). This can be considered to be because in the nonaqueous electrolyte battery of Comparative Example 9, CA/A was 700 and therefore insufficient.

In the nonaqueous electrolyte battery of Comparative Example 10, the gas generation amount after subjecting to charging and discharging cycles was as high as 1.0 Ah/mL. It can be considered that in the nonaqueous electrolyte battery of Comparative Example 10, CA/A was as high as 5000, that is, the area of the positive electrode was large, and therefore side reactions readily occurred within the battery unit, resulting in the gas generation amount becoming high.

According to at least one embodiment and example described above, the nonaqueous electrolyte battery and battery pack include a positive electrode including $Li_{1-x}Mn_{2-y-z}Al_yM_zO_4$ and a negative electrode including a first oxide represented by $Li_{4+a}Ti_5O_{12}$ and a second oxide of at least one element selected from the group consisting of Al, Co, Cr, Cu, Fe, Mg, Ni, Zn, and Zr in an amount of from 300 ppm to 5000 ppm relative to the weight of the first oxide. The nonaqueous electrolyte battery and battery pack have improved charging and discharging performance and a low amount of gas generation, as well.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
a positive electrode comprising an active material comprising $Li_{1-x}Mn_{2-y-z}Al_yM_zO_4$ ($-0.1 \leq x \leq 1$, $0.20 \leq y \leq 0.35$, $0 \leq z \leq 0.1$, M is at least one metal selected from the group consisting of Mg, Ca, Ti, V, Cr, Fe, Co, Ni, Cu, Zn, Zr, Nb, Mo, and Sn);
a negative electrode comprising an active material comprising a mixture, the mixture comprising a first oxide represented by $Li_{4+a}Ti_5O_{12}$ ($-0.5 \leq a \leq 3$), and a second oxide of at least one element selected from the group consisting of Al, Co, Cr, Cu, Fe, Mg, Ni, Zn, and Zr in an amount of from 300 ppm to 5000 ppm relative to a weight of the first oxide; and
a nonaqueous electrolyte.

2. The nonaqueous electrolyte battery according to claim 1, which satisfies the following formula (1):

$$800 \leq (CA/A) \leq 4000 \quad (1)$$

where A is a rated capacity [Ah] of the nonaqueous electrolyte battery, and CA is an area [cm2] of the positive electrode.

3. The nonaqueous electrolyte battery according to claim 2, wherein the active material of the positive electrode comprises $Li_{1-x}Co_{1-b}M'_bO_2$ wherein $0.1 \leq x \leq 1$, $0 \leq b \leq 0.3$, M' is at least one metal selected from the group consisting of Al, Mg, Ca, Ti V, Cr, Mn, Fe, Co, Ni, Cu, Zn, Zr, Nb, Mo, and Sn.

4. A battery pack comprising the nonaqueous electrolyte battery according to claim 1.

5. The nonaqueous electrolyte battery according to claim 1, wherein the mixture comprises first particles of the first oxide and second particles of the second oxide.

* * * * *